(12) United States Patent
Ishida et al.

(10) Patent No.: US 11,370,671 B2
(45) Date of Patent: Jun. 28, 2022

(54) ZINC OXIDE VARISTOR

(71) Applicants: KOA CORPORATION, Ina (JP); JFE MINERAL COMPANY, LTD., Tokyo (JP)

(72) Inventors: Naomi Ishida, Fuchu (JP); Yoji Gomi, Nagano (JP); Kenichi Iguchi, Nagano (JP); Etsurou Udagawa, Tokyo (JP); Yuko Echizenya, Tokyo (JP); Yoshimi Nakata, Tokyo (JP)

(73) Assignees: KOA Corporation, Nagano (JP); JFE Mineral Company, Ltd., Tokyo (JP)

( * ) Notice: Subject to any disclaimer, the term of this patent is extended or adjusted under 35 U.S.C. 154(b) by 0 days.

(21) Appl. No.: 15/734,863

(22) PCT Filed: Jun. 4, 2019

(86) PCT No.: PCT/JP2019/022242
§ 371 (c)(1),
(2) Date: Dec. 3, 2020

(87) PCT Pub. No.: WO2019/235499
PCT Pub. Date: Dec. 12, 2019

(65) Prior Publication Data
US 2021/0238052 A1  Aug. 5, 2021

(30) Foreign Application Priority Data

Jun. 6, 2018 (JP) .............................. JP2018-108770

(51) Int. Cl.
*H01B 1/08* (2006.01)
*C01G 9/02* (2006.01)
(Continued)

(52) U.S. Cl.
CPC ............... *C01G 9/00* (2013.01); *H01B 1/08* (2013.01); *H01C 7/112* (2013.01); *B82Y 40/00* (2013.01);
(Continued)

(58) Field of Classification Search
CPC .......... H01B 1/08; H01C 7/12; C04B 35/453; C01G 9/02
See application file for complete search history.

(56) References Cited

U.S. PATENT DOCUMENTS

| 5,382,385 A * | 1/1995 | Ochi ...................... H01C 7/112 |
| | | 252/519.5 |
| 8,399,092 B2 * | 3/2013 | Sueda .................... C01G 9/02 |
| | | 428/402 |

(Continued)

FOREIGN PATENT DOCUMENTS

| JP | S63-224303 A | 9/1988 |
| JP | 2001-220136 A | 8/2001 |

(Continued)

OTHER PUBLICATIONS

English language translation of form PCT/ISA/237 (mailed Jun. 2018).*

(Continued)

*Primary Examiner* — Mark Kopec
(74) *Attorney, Agent, or Firm* — Carrier Blackman & Associates, P.C.; Joseph P. Carrier; Anne G. Sabourin

(57) ABSTRACT

Focusing on zinc oxide itself, which is a main raw material for a zinc oxide varistor (laminated varistor), a predetermined amount of additive is added to a zinc oxide powder having crystallite size of 20 to 100 nm, particle diameter of 20 to 110 nm found using a specific area BET method, untamped density of 0.60 g/cm$^3$ or greater, and tap density of 0.80 g/cm$^3$ or greater. This allows a zinc oxide sintered (Continued)

body to secure uniformity, high density, and high electric conductivity, resulting in a zinc oxide varistor with high surge resistance, capable of downsizing and cost reduction. Moreover, addition of aluminum (Al), as a donor element, to the zinc oxide powder allows control of sintered grain size in conformity with the aluminum added amount and baking temperature, and also allows adjustment of varistor voltage, etc.

7 Claims, 6 Drawing Sheets

(51) Int. Cl.
*H01C 7/12* (2006.01)
*C01G 9/00* (2006.01)
*H01C 7/112* (2006.01)
*B82Y 40/00* (2011.01)

(52) U.S. Cl.
CPC ...... *C01P 2002/70* (2013.01); *C01P 2004/64* (2013.01); *C01P 2006/11* (2013.01); *C01P 2006/12* (2013.01)

(56) References Cited

U.S. PATENT DOCUMENTS

| | | | |
|---|---|---|---|
| 2010/0136337 A1* | 6/2010 | Ando | H01C 7/112 428/402 |
| 2012/0238052 A1* | 9/2012 | Iida | H01B 1/22 438/73 |
| 2021/0354995 A1* | 11/2021 | Udagawa | C04B 35/453 |

FOREIGN PATENT DOCUMENTS

| | | |
|---|---|---|
| JP | 2003-119080 A | 4/2003 |
| JP | 2007-008805 A | 1/2007 |
| JP | 2010-150093 A | 7/2010 |
| JP | 2013-189369 A | 9/2013 |
| JP | 2014-097922 A | 5/2014 |
| JP | 5617410 B2 | 11/2014 |
| JP | 2015-15455 A | 1/2015 |
| JP | 2015-038014 A | 2/2015 |

OTHER PUBLICATIONS

Katsuyama, Tomoyuki, "State-of-the-Art Research and Prospective of Zinc Oxide", 3, Particles, CMC Publishing Co., Ltd., published on Jan. 31, 2011.

* cited by examiner

ZINC OXIDE VARISTOR

TECHNICAL FIELD

The present invention relates to a zinc oxide varistor for protecting a circuit from a lightening-induced surge etc., for example.

BACKGROUND ART

Due to rapid expansion in various fields of electronic devices, usage environments of electronic components to be mounted thereupon are also changing remarkably. For example, due to revisions of standards and various applications for automobiles, industrial equipment, etc., demands for higher performance etc. of electronic components that were unexpected in the past have been increasing. As a result, electronic components for protecting vulnerable electronic circuits from unexpected noise and pulses such as various surges and pulse noise are in demand. Moreover, out of duly consideration of operating environmental influence of sulfurization, water condensation, etc., provision of electronic components having not only high initial functions but also high continuous reliability is essential.

A varistor conventionally known as a non-linear resistance element is used for protecting a vulnerable circuit from abnormal voltages such as various surges and pulse noise in wide fields and applications as mentioned above so as to secure stability of operation and to provide a counter measure against ESD (electrostatic discharge). Moreover, while many electronic components have been devised to save component mounting space and be thinner and shorter, the varistor is not an exception. While miniaturization and reduction in cost of the varistor is desired, further reduction in mounting space and size has reached its limit under the present conditions.

Electrical properties and reliability of the varistor obtained change greatly according to different combination of additives and different dosages thereof. For example, grain growth may fluctuate at the time of sintering due to the blending ratio of base materials to be added. Large differences in clamping voltage, which is a basic characteristic of the varistor, and circuit protection capability at the time of applying a large surge occur as a result.

Here, ceramics and zinc oxide (ZnO) used as sintering members are described below.

Zinc oxide has characteristics such as a higher zinc steam pressure and easier grain growth than those of other ceramic powders such as aluminum oxide and zirconium oxide. The base powder has been widely used as a white pigment from long ago, manufacturing methods of a French method and a German method are established, and high-quality powders are supplied at a low cost. However, smallest grains of these powders are as little as approximately 0.3 to 0.6 μm in size, and densification of the base material for a sintering member at a low temperature cannot be expected, and thus obtained sintered grains are large in size.

In recent years, powders at a grade of 0.3 μm or less, which are synthesized through a wet process, primarily for cosmetics are also supplied at a relatively low cost. While it is important for the zinc oxide powder of the base material to be small in grain size in order to carry out low-temperature sintering not using the formation of melt or a sintering additive, there is no proposal for an effective means to deal with grain growth control, which is one of the problems of the present invention. Problems of the present invention will be made clear below mostly from the patent documents.

In Patent Document 1, zinc oxide obtained by dripping a carbon alkaline agent into water-soluble zinc carboxylate and controlling it until reaching a constant pH forms tubular secondary particles, which are made through its primary particles aggregating, and is intended for cosmetics that exhibit excellent ultraviolet ray shielding performance and transparency. However, tap density is low and grain growth is large due to the tubular or precursor-shaped mark. It is effective for concealment, which is required for cosmetics, but is unsuitable as a base material for a sintered body. More specifically, acetic acid is added to a zinc chloride aqueous solution and dissolved, and a sodium carbonate solution is dripped therein until reaching pH8. Once the obtained precipitate is passed through a filter and rinsed with water, it is dried and heat-treated at 400° C. for three hours, thereby obtaining a zinc oxide powder.

Patent Document 2 relates to basic zinc chloride in flake form having excellent concealing property. While this document provides a technology with excellent control of crystallinity, form, and size, a large quantity of chlorine remains even if it is made into zinc chloride through heat treatment. Mainly regarding aspect control, it is unsuitable as a sintering base material due to the large flake form having an aspect ratio of 10 or greater, easiness of sintering into the plate shape at the time of dechlorination and dewatering, largeness of the sintering grain size, and largeness of voids at the time of sintering.

Patent Document 3 relates to manufacturing of a thermistor, with which improvement in performance as an exhaust gas temperature sensor for automobiles is anticipated. This is manufactured through wet synthesis (spray pyrolysis) of a precursor allowing both uniformity in composition and dense structure of a thermistor sintering member or multiple oxide, and heat treatment of the obtained powder having an average grain diameter of 30 to 50 nm, resulting in improvement in tap density by using grain growth up to an average grain diameter of 0.1 to 1 μm. Use of grown grains may reduce the amount of binder used, thereby obtaining a dense sintered body having a near net shape. However, with this method, a lower sintering temperature and control of grain growth cannot be expected.

Patent Document 4 relates to manufacturing of granulated powder having a high sphericity, and provides a filler having a high filling rate used in grease and paint. In manufacturing filler particles, a surfactant or binder is used in an organic solvent so as to make a slurry without specifying zinc oxide primary particles to be used, and the slurry is dried using a spray dryer, making sphericalness (major axis/minor axis) be 1.00 to 1.10 and median diameter (D50) be 20 to 100 μm. Moreover, making the size ratio of D90/D10 be 2.8 or less gives few extremely large particles, resulting in improvement of filling rate, reduction in repose angle, and provision of an excellent filler material. However, the granulated powder obtained using this method is unsuitable as a sintered material. This is because at the time of sintering, spherical and particle-shaped powder (filler) shrinks, thereby forming large voids. Such voids may be reduced through sintering at a high temperature for a long time, but cannot be eliminated.

In Patent Document 5, zinc oxide powder and zinc oxide multiple oxide powder intended for a sputtering target is provided. The sputtering target requires high density, high heat conductivity, and a uniform structure. With this technology, capsule HIP (hot isostatic pressing and sintering) is used as a sintering method for densification, and as a resulting problem, the capsule filling rate (base powder tap density/theoretical density) is set to 50% or higher. A powder having a tap density of 2.8 g/cm³ that is achieved by sintering zinc oxide powder having a tap density of less than 50% at 900 to 1400° C. in open air is used as a means to solve the problem. While it is the same method as in Patent Document 3 since the method of improving tap density is heat treatment, sintering using the capsule HIP method allows further prevention of volatilizing zinc oxide and also allows a lower sintering temperature than with open air sintering. It can be called technology that realizes denseness, high strength and low grain growth. However, this method provides a sintering material assuming the capsule HIP method.

In Non-Patent Document 1, flower petal-shaped zinc oxide having both high ultraviolet ray protection and high transparency is manufactured through titration under the conditions of a high temperature and a constant pH. In this case, card-shaped precursor basic zinc carbonates connect to each other and grow into flower petal shapes. When that is converted to zinc oxide through heat treatment, its form is maintained. Therefore, since seed crystals become large and grain growth increases remarkably, a uniform sintered body cannot be obtained. More specifically, a zinc chloride solution and an alkaline solution (liquid mixture of sodium carbonate and sodium hydroxide) are dripped into water kept at 60° C. so as to meet the requirement of a constant pH. Once the obtained precipitate is passed through a filter and rinsed with water, it is dried and the dry matter is sintered at 400° C., thereby obtaining zinc oxide.

PRIOR ART DOCUMENTS

Patent Documents

Patent Document 1: JP 2007-8805 A
Patent Document 2: JP 2015-038014 A
Patent Document 3: JP 2003-119080 A
Patent Document 4: JP Patent No. 5617410
Patent Document 5: JP 2013-189369 A Non-Patent Documents Non-Patent Document 1: "State-of-the-Art Research and Prospective of Zinc Oxide", 3. Particles, KATSUYAMA Tomoyuki (CMC Publishing CO., LTD.), published on Jan. 31, 2011.

DISCLOSURE OF THE INVENTION

Problem to be Solved by the Invention

As described above, a varistor has a characteristic in that it can obtain the essential capacities by adding various additives and controlling grain growth and degree of sintering. However, achieving a varistor having ideal, excellent basic characteristics is difficult. It is impossible to change the characteristics of the zinc oxide base material itself, which occupies approximately 90% of the varistor base material and is an essential material for the varistor characteristics. Conventionally, the characteristics have been secured through interaction between the zinc oxide base material and various additives.

Generally, zinc oxide has characteristics of a higher zinc vapor pressure, easier grain growth, etc. than other ceramic powders such as aluminum oxide and zirconium oxide. Most zinc oxide is manufactured by the aforementioned French method, wherein the grain size is approximately 0.3 to 0.6 µm, and there are many distortions and anisotropic parts within the crystallites. Therefore, the already existing varistor using these materials has problems of abnormal grain growth and instable grain form generated during the sintering process, and regarding tolerance to surge pulses such as lightening or the like, which is an important characteristic of a varistor, load concentration occurs due to nonuniformity of grains when a high voltage pulse surge is applied, resulting in significant degradation of the characteristics.

As a countermeasure for these problems, performance improvement has been attempted by devising additive composition and manufacturing process of the conventional varistor, but sufficient performance has not yet been secured.

In light of these problems, the present invention aims to provide a highly reliable zinc oxide varistor that can be made compact and reduce cost.

Means of Solving the Problems

As a means for achieving said aim and solving the problems described above, a zinc oxide varistor according to the present invention is characterized by including: zinc oxide (ZnO) as a main component, one or more kinds of additives selected as a grain boundary forming component from a group including bismuth (Bi) and praseodymium (Pr), and one or more kinds of additives selected as a transition metal element from a group including cobalt (Co), manganese (Mn) and nickel (Ni), wherein the zinc oxide has a crystallite size of 20 to 100 nm found by X-ray diffraction, grain diameter of 20 to 110 nm found using a BET method, untamped density of 0.60 g/cm³ or greater, and tap density of 0.80 g/cm³ or greater.

For example, the zinc oxide varistor described above is characterized in that one or more kinds of donor elements including boron (B) and gallium (Ga) is further added.

The zinc oxide varistor according to the present invention is a zinc oxide powder used for manufacturing a sintered body, for example, and is characterized in that an amount of aluminum (Al) represented by the following Expression (I) 20 ppm or greater and 2 mol % or less in molar ratio is added as a donor element to zinc (Zn);

$$\{n_{Al}/(n_{Zn}+n_{Al})\} \times 100 \qquad (I)$$

where $n_{Al}$ denotes amount of Al in the zinc oxide powder, $n_{Zn}$ denotes amount of Zn in the zinc oxide powder, and unit of $n_{Zn}$ and $n_{Al}$ is mol.

Further, it is characterized in that the aluminum-added zinc oxide, which is generated by adding the aluminum (Al), is obtained by heat treating at a temperature of 250° C. or higher, a basic zinc carbonate which is a carbonate hydrate and containing aluminum, generated through precipitation producing reactions of an aluminum salt, a zinc salt, a carbonate, and an alkali. Yet further, it is characterized in that the carbonate hydrate contains a basic zinc carbonate represented by the following Expression (1);

$$M_{4-6}(CO_3)_{1-3}(OH)_{6-7} \cdot nH_2O \qquad (1)$$

where M denotes $Zn_{1-x}Al_x$, x denotes a number $2 \times 10^{-5}$ to 0.02, and n denotes a number 0 to 2.

Yet even further, for example, it is characterized in that either powder of the aluminum-added zinc oxide is molded as is, or molded after either pulverizing using a bead mill or granulating using a spraying dryer, and sintered at a temperature of 1200° C. or lower, resulting in a zinc oxide sintered body.

As a means to solve the problems described above, a zinc oxide varistor manufacturing method according to the present invention is characterized by including the steps of:

manufacturing a basic zinc carbonate slurry which is a first precursor of a zinc oxide (ZnO) powder; obtaining from the first precursor a basic zinc carbonate dried powder that is a second precursor of zinc oxide (ZnO) powder; heat treating the second precursor so as to obtain zinc oxide (ZnO); manufacturing mixed materials resulting from adding predetermined additives to the zinc oxide (ZnO); and forming a varistor element for a zinc oxide varistor from the mixed materials.

For example, in the zinc oxide varistor manufacturing method, the zinc oxide varistor is characterized by including: zinc oxide (ZnO) as a main component, one or more kinds of additives selected as a grain boundary forming component from a group including bismuth (Bi) and praseodymium (Pr), and one or more kinds of additives selected as a transition metal element from a group including cobalt (Co), manganese (Mn) and nickel (Ni), wherein the zinc oxide has a crystallite size of 20 to 100 nm found by X-ray diffraction, grain diameter of 20 to 110 nm found using a BET method, untamped density of 0.60 g/cm³ or greater, and tap density of 0.80 g/cm³ or greater.

For example, the manufacturing method of the zinc oxide varistor is characterized in that one or more kinds of donor elements including boron (B) and gallium (Ga) is further added.

The manufacturing method of a zinc oxide varistor according to the present invention is further characterized in that an amount of aluminum (Al) 20 ppm or greater and 2 mol % or less in molar ratio is added as a donor element to zinc (Zn). Yet further, for example, it is characterized in that the aluminum-added zinc oxide, which is generated by adding the aluminum (Al), is obtained by heat treating at a temperature of 250° C. or higher, a carbonate hydrate generated through precipitation producing reactions in an aluminum salt aqueous solution, a zinc salt aqueous solution, a carbonate aqueous solution, and an alkali aqueous solution.

Yet further, it is characterized in that the carbonate hydrate contains a basic zinc carbonate represented by the following Expression (1);

$$M_{4-6}(CO_3)_{1-3}(OH)_{6-7} \cdot nH_2O \qquad (1)$$

where M denotes $Zn_{1-x}Al_x$, x denotes a number $2 \times 10^{-5}$ to 0.02, and n denotes a number 0 to 2.

Yet even further, for example, it is characterized in that either powder of the aluminum-added zinc oxide is molded as is, or molded after either pulverizing using a bead mill or granulating using a spraying dryer, and sintered at a temperature of 1200° C. or lower, resulting in a zinc oxide sintered body.

Results of the Invention

According to the present invention, a zinc oxide varistor capable of controlling variation in varistor voltage due to uniform sintered grain size in a zinc oxide sintered body, and having excellent surge current resistance and low clamping voltage while securing high denseness and high electric conductivity may be provided. Moreover, control of the amount of aluminum to be added to the zinc oxide and of the baking temperature allows control of the sintered grain size and suppression of variation in size.

DESCRIPTION OF EMBODIMENTS

Figure 1:
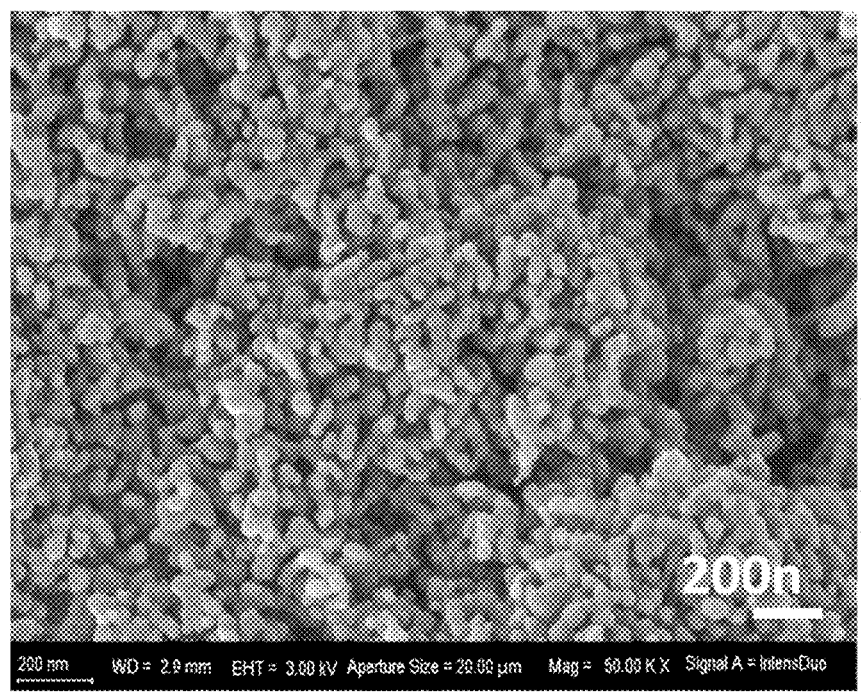
FIG. 1 is a SEM image of a zinc oxide powder of Synthesis Example 1 according to the present invention.

An embodiment according to the present invention is described in detail below with reference to accompanying drawings and tables.

1. Zinc Oxide Powder

[Configuration of Zinc Oxide Powder]

(1) A zinc oxide powder used for a zinc oxide varistor according to the present invention has a crystallite size of 20 to 100 nm, which is found through X-ray diffraction, a particle diameter of 20 to 110 nm, which is found through a BET method, untamped density of 0.60 g/cm³ or greater, and tap density of 0.80 g/cm³ or greater.

Here, untamped density is found by finding mass at the time of freely dropping zinc oxide powder into a standstill 100 ml container using a method stipulated in JIS R 9301-2-3. This mass is divided by the volume of the container, thereby giving untamped density.

As described in working examples and comparative examples later, the zinc oxide powder used for the zinc oxide varistor according to the present invention is characteristic of having a higher tap density than that of the comparative examples obtained using conventional technology. The composition of the zinc oxide powder used for the zinc oxide varistor according to the present invention allows provision of high filling density and increased contact points between particles when making a press-molded body or a thick film-molded body using a paste. Through this, a sintered body that has little shrinkage and is dense even at a low temperature of 1000° C. or less may be obtained. Moreover, grain growth is small even when sintered at a high temperature of 1000° C. or higher. The sintered body obtained through sintering has a small sintered grain size, and thus has high density and high strength.

(2) On the other hand, it is proven that, as described later, zinc oxide powder used for the zinc oxide varistor according to the present invention, to which aluminum (Al) is added as a donor element, has controlled grain growth as well as has provided uniform sintered grain size when aluminum concentration is 20 mol ppm or greater, for example, and baking temperature is 1200° C. or lower, for example. Moreover, when the aluminum concentration is less than 20 mol ppm and the baking temperature is higher than 1200° C., increase in sintered grain size is seen.

[Zinc Oxide Powder Manufacturing Method]

The zinc oxide powder manufacturing method according to the present invention is not particularly limited. However, there is a suitable method of obtaining the zinc oxide powder of the present invention (also conveniently referred to as 'powder manufacturing method of the present invention' hereafter) by heat treating at a temperature of 250° C. or higher, an aluminum-containing, basic zinc carbonate, which is a carbonate hydrate, generated through precipitation producing reactions with an aluminum salt, a zinc salt, a carbonate, and an alkali, for example.

The zinc oxide powder obtained by the powder manufacturing method of the present invention has higher untamped density and tap density, for example, than zinc oxide powders having the same crystallite size obtained using other methods, as long as the Al content is the same (See Evaluation 2 described later). While it is evident, if heat treatment conditions for the precursor are high, dense secondary particles are formed by necking primary particles, thereby increasing untamped density and tap density.

Moreover, use of the zinc oxide powder obtained using the powder manufacturing method of the present invention increases density of the molded body and the sintered body (See Evaluation 3 and Evaluation 4 described later).

Furthermore, the sintered body using the zinc oxide powder obtained using the powder manufacturing method of the present invention shows tendencies of smaller sintered grain sizes, little variation thereof, and high strength (See Evaluation 4 described later).

The zinc oxide powder obtained using the powder manufacturing method of the present invention has aluminum contained in the powder particles homogeneously due to being made from the aluminum-containing, basic zinc carbonate (precursor), and is thus presumed to achieve the effects as described above.

It must be added, however, that individual particles of the zinc oxide powder are extremely minute, and thus observing the state of aluminum included therein so as to directly specify them is effectively impossible.

Specifying other components and characteristics due to the state of the aluminum requires repeating much trial and error, and is thus nearly impractical.

Use of any of an aluminum salt, a zinc salt, a carbonate, and an alkali in an aqueous solution state is preferred with the powder manufacturing method of the present invention.

Causing precipitation producing reactions by titrating, specifically, a zinc salt aqueous solution and an aluminum salt aqueous solution (preferably a mixed aqueous solution of zinc salt and aluminum salt) into a carbonate aqueous solution is preferred. During this titration, it is preferable to feed an alkali aqueous solution into the carbonate aqueous solution so as to maintain the pH of the carbonate aqueous solution at a constant value (e.g., a value between pH 6 to 8).

Through the precipitation producing reactions, a carbonate hydrate (basic zinc carbonate) can be obtained as a precipitate. The precipitate is preferably stirred and cured.

Duration of stirring and curing is preferably one hour or more, more preferably five hours or more, and even further preferably 10 hours or more, for the reason that the untamped density and the tap density of the obtained zinc oxide powder increase. Stirring and curing for 15 hours or more is especially preferred.

In the case of a short duration of stirring and curing, the primary particles coupled into flake shapes (e.g., see FIG. 2 described later), which are a characteristic of layered hydroxide, are thought to be easily obtained. In contrast, when the duration of stirring and curing is long, the primary particles repeatedly collide with one another due to stirring, losing the flake shapes, and thus granular shapes (e.g., see FIG. 1 described later) are thought to be easily obtained.

Note that while the duration of stirring and curing depends on concentration of the solution and stirring force, the upper limit is not particularly limited, and is 32 hours or less, preferably 24 hours or less, for example.

During the precipitation producing reaction and the stirring and curing, temperature of the carbonate aqueous solution is preferably kept under 45° C. It is more preferably 25° C. or less.

The aluminum salt is not particularly limited. However, it may preferably be aluminum nitrate, aluminum chloride, aluminum sulfate, or a hydrate thereof, etc., for example.

While the zinc salt is not particularly limited, it may preferably be zinc nitrate, zinc sulfate, zinc chloride, zinc acetate, or a hydrate thereof, etc., for example.

The alkali is also not particularly limited. However, it may preferably be sodium hydroxide, potassium hydroxide, or an ammonium aqueous solution, etc., for example.

While the carbonate may be ammonium carbonate, sodium carbonate, sodium hydrogen carbonate (sodium bicarbonate), etc., of them, ammonium carbonate is preferred from the reason that the untamped density and the tap density of the obtained zinc oxide powder are high.

It is preferable that the carbonate hydrate generated through the precipitation producing reactions is an aluminum-containing, basic zinc carbonate, and more preferably contains the basic zinc carbonate represented by the following Expression (1);

$$M_{4\text{-}6}(CO_3)_{1\text{-}3}(OH)_{6\text{-}7} \cdot nH_2O \qquad (1)$$

where M denotes $Zn_{1-x}Al_x$, x denotes a number $2\times10^{-5}$ to 0.02, and n denotes a number 0 to 2.

The basic zinc carbonate represented by Expression (1) described above may be a basic zinc carbonate produced by substituting aluminum for a part of the zinc in hydrozincite $(Zn_5(CO_3)_2(OH)_6 \cdot 2H_2O)$ and adding aluminum uniformly at a molecular size level. This kind of basic zinc carbonate may also be referred to as hydrozincite below for the sake of convenience. The carbonate hydrate (basic zinc carbonate) generated through the precipitation producing reactions preferably has this kind of hydrozincite as a main component. The main component denotes the largest quantity component of constitutive substances, preferably 50% by mass or greater, more preferably 60% by mass or greater.

The carbonate hydrate (basic zinc carbonate) obtained through the precipitation producing reactions is decarbonized and dehydrated through a heat treatment at a temperature of 250° C. or higher, obtaining a zinc oxide powder.

There are cases where both the removed amounts resulting from decarbonization and dehydration at the time of baking when obtaining a zinc oxide sintered body to be described later will increase if the heat treatment temperature is too low, resulting in inhibiting sintering.

On the other hand, if the heat treatment temperature is too high, there is fear that coupled particles resulting from bonded primary particles may increase. Large coupled particles grow quickly, thereby making larger sintered particles, which is a phenomenon known as Ostwald ripening, resulting in ununiform particle sizes of the sintered body.

From such a viewpoint, a heat treatment temperature of 350° C. to 420° C. is preferred. However, it can be easily presumed that from the fact that the zinc oxide particles of the present invention are nanosized, growth and necking of the primary particles progress, resulting in secondary particles differing in density and strength, and increase in untamped density and tap density.

The powder manufacturing method of the present invention has been described as a preferred embodiment of the zinc oxide powder manufacturing method according to the present invention.

However, the method of manufacturing the zinc oxide powder of the present invention is not limited to the powder manufacturing method of the present invention described above. Even if it is manufactured by a different method, and pulverization, classification, and particle size distribution etc. are adjusted as needed, it is still considered as the zinc oxide powder of the present invention as long as it is within the scope of the present invention.

Note that 'a different method' can be a method of heat-treating a basic zinc carbonate not containing Al, which is generated through precipitate generating reactions with a zinc salt, a carbonate, and an alkali, for example, thereby obtaining a zinc oxide powder, and then adding aluminum as an aluminum salt aqueous solution etc. thereto, thereby obtaining an aluminum-containing zinc oxide powder.

[Zinc Oxide Sintered Body]

The zinc oxide sintered body of the present invention results from sintering the zinc oxide powder of the present invention described above. Therefore, the zinc oxide sintered body of the present invention contains aluminum. The aluminum is preferably dissolved.

The zinc oxide sintered body of the present invention is obtained by baking the zinc oxide powder of the present invention described above. More specifically, for example, either the zinc oxide powder of the present invention is molded as is, or molded after either pulverizing using a bead mill or granulating using a spraying dryer, and the obtained molded body is baked thereafter. This results in the zinc oxide sintered body of the present invention.

Baking temperature is between 800° C. and 1300° C. inclusive, for example. Moreover, temperature for baking the zinc oxide to which aluminum is added is preferably 900° C. or higher, more preferably 1000° C. or higher. Furthermore, the baking temperature is preferably 1150° C. or lower, more preferably 1100° C. or lower.

The zinc oxide sintered body of the present invention is used as a member made of ceramics. More specifically, it is suitably used as: plate-shaped bulk material; a thick film baked object; a sputter target requiring uniform density and particle size; a porous member, such as a gas sensor or filter (antibacterial filter for preventing proliferation of Escherichia coli and the like, etc.), etc., for example.

WORKING EXAMPLES

The present invention is described in detail below through working examples. However, the present invention is not limited to these examples.

Synthesis Example 1 (Working Examples E and Comparative Examples 1)

(Synthesis)

Zinc nitrate 6-hydrate (manufactured by Kishida Chemical Co., Ltd.) is used as the zinc salt, aluminum nitrate 9-hydrate (manufactured by Kishida Chemical Co., Ltd.) is used as the aluminum salt, ammonium carbonate (manufactured by Kishida Chemical Co., Ltd.) is used as the carbonate, and 30% by mass sodium hydroxide (manufactured by Kishida Chemical Co., Ltd.) is used as the alkali.

A combination of zinc nitrate and aluminum nitrate weighed to make a total amount of 0.5 mol is dissolved in 1 L of pure water, so as to prepare a mixed aqueous solution of zinc nitrate and aluminum nitrate.

0.5 L of a 0.4 mol ammonium carbonate aqueous solution is prepared in a 2 L beaker.

A pH electrode for controlling pH is inserted in the ammonium carbonate aqueous solution, and the mixed aqueous solution of zinc nitrate and aluminum nitrate is dripped at a rate of 1 L/h into the ammonium carbonate aqueous solution while the ammonium carbonate aqueous solution is stirred using a rotator at a rotating speed set to approximately 700 rpm.

In order to prevent decrease in pH of the ammonium carbonate aqueous solution when dripping the mixed aqueous solution of zinc nitrate and aluminum nitrate, which is acidic, the 30% by mass sodium hydroxide is dripped into the ammonium carbonate aqueous solution using a liquid feeding pump for controlling on/off by a pH controller (TDP-51, manufactured by Toko Kagaku Kenkyujo Co., Ltd.). This maintains a constant pH of the ammonium carbonate aqueous solution at 7.5 while dripping the mixed aqueous solution of zinc nitrate and aluminum nitrate. As a result, a precipitate is generated through the precipitation producing reaction.

Once the solution feeding is completed, the solution is stirred and cured for 20 hours using the rotator set to the same rotating speed of approximately 700 rpm as during the precipitation reaction, thereby obtaining an aluminum-containing, basic zinc carbonate slurry.

Using a cooling device, temperature of the ammonium carbonate aqueous solution is always kept under 30° C. during the precipitation producing reaction, and stirring and curing.

The stirred and cured slurry is separated into solid and liquid using a suction filtration method so as to obtain solid content. The obtained solid content is rinsed, removing unnecessary sodium, etc. More specifically, once the solid content is made into a slurry using an appropriate amount of pure water, the resulting slurry is separated into solid and liquid using a suction filtration method. This rinsing is repeated four times.

The rinsed solid content is vacuum dried at 30° C. for 20 hours using a vacuum dryer. As a result, a dried powder of the aluminum-containing, basic zinc carbonate, or a precursor of the zinc oxide powder is obtained.

According to Synthesis Example 1 (Working Examples E and Comparative Examples 1), synthesis is carried out such that the molar ratio (Al/Zn) of aluminum and zinc is within a range of 0/100 to 10/90.

That is, the aluminum content represented by Expression (1) described above is set to 20 mol ppm, 200 mol ppm, 2000 mol ppm, and 20000 mol ppm (2 mol %) in Working Examples E, and 0 mol ppm, 10 mol ppm, 50000 mol ppm (5 mol %), and 100000 mol ppm (10 mol %) in Comparative Examples 1.

Note that in the case where the aluminum content is 0 mol ppm, a zinc nitrate aqueous solution is prepared without using the aluminum nitrate 9-hydrate, and is then dripped into the ammonium carbonate aqueous solution.

For the resultant basic zinc carbonate, identification of mineral phases using an X-ray diffractometer (D8 ADVANCE, manufactured by Bruker Co., Ltd.), and measurement of crystallite size using the Debye-Scherrer method are carried out.

Moreover, measurement of thermal reduction using a TG-DTA device (TG/DTA 6300, manufactured by Hitachi High-Technologies Corporation), carbon analysis using a combustion method with an analysis device (LECO CS844), and analysis of Zn and Na using an ICP optical emission spectrometer (ICP-9000, manufactured by Shimadzu Corporation) are carried out.

It is found from the results of X-ray diffraction and component analysis that a basic zinc carbonate having hydrozincite as a main component is obtained.

Note that in Comparative Example 1 where the Al content is 10 mol %, a heterogeneous phase identified as zinc aluminum carbonate hydroxide hydrate is predominant.

Upon analysis of the filtrate, precipitate yield is found to be 99%. Moreover, it is found that thermal reduction due to decarbonization and dehydration is complete at around 600° C.

(Heat Treatment)

The obtained basic zinc carbonate is placed in an alumina crucible, and heat treatment for decarbonization and dehydration is carried out at 360° C. in the atmosphere. Temperature rising rate is set to 2° C./min., retention time at 360° C. is six hours, and cooling is natural cooling. This results in obtaining a zinc oxide powder. While heat treatment temperature is preferably 250° C. or higher, more preferably 350° C. to 420° C., it may be selected in accordance with required sintered body properties. With the present invention, earnest examination of heat treatment temperature is conducted in order to clarify the effect on untamped density and tap density.

(Manufacturing of Molded Bodies)

The obtained zinc oxide powder is passed through a 0.6 mm sieve so as to carry out simple grinding, and is press molded at a pressure of approximately 60 MPa into a 20 mm in diameter×2 mm disc-shaped molded body and a 40×40×5 mm plate-shaped molded body. Each of the molded bodies are manufactured with n=15.

At this time, taking into consideration that the effects of differences in powder characteristics of the zinc oxide powder due to synthesis conditions on the molded bodies and sintered bodies will be clear, granulation etc. is not carried out using a spraying dryer or the like. However, this does not apply to manufacturing of actual products.

As described later, disc-shaped molded bodies are used as samples for observation using a scanning electron microscope (SEM), measurement of density, and X-ray diffraction, and plate-shaped molded bodies are used as samples for measurement of electric resistance and bending strength.

(Manufacturing of Sintered Bodies)

The manufactured disc-shaped and plate-shaped molded bodies are baked in the atmosphere. Baking temperature is set to 900 to 1200° C. (at 100° C. intervals), retention time at the baking temperature is six hours, temperature rising rate is 4° C./min., and they are left in a cooling furnace to cool. This results in obtaining disc-shaped and plate-shaped sintered bodies.

<Evaluation 1>

Various evaluations are conducted using the obtained sintered bodies.

The disc-shaped sintered bodies are observed using a SEM so as to measure sintered grain size (unit: μm).

Once the plate-shaped sintered bodies are processed into 30 mm×4 mm×4 mm bars, volume resistivity (unit: Ω·cm) is measured using a four-terminal method, and bending strength (unit: MPa) is measured in conformity to ISO178.

Sintered grain size, bending strength, and volume resistivity are set as respective average values for 15 samples. Standard deviation and coefficient of variation (=(standard deviation/average value)×100) of sintered grain size and bending strength are also found. Coefficient of variation (unit: %) is an index of variation. Results are given in Table 1, Table 2, and Table 3 below.

Note that the sintered bodies are manufactured in the same way as in Working Examples E and Comparative Examples 1 using a zinc oxide powder of Reference Examples 2 (Synthesis Example 2) described later so as to measure volume resistivity. Results are also given in Table 3 below.

TABLE 1

| Baking temperature [° C.] | Sintered body characteristics | Comparative Example 1 | | Working Example E | | | | Comparative Example 1 | |
|---|---|---|---|---|---|---|---|---|---|
| | | 1-1 | 1-2 | E-1 | E-2 | E-3 | E-4 | 1-3 | 1-4 |
| | | Al content [mol ppm] | | | | | | | |
| | | 0 | 10 | 20 | 200 | 2000 | 20000 | 50000 | 100000 |
| 900 | Sintered grain size [μm] | 1.10 | 1.00 | 0.80 | 0.70 | 0.60 | 0.55 | 0.50 | 0.50 |
| | Standard deviation | 0.3890 | 0.3250 | 0.2480 | 0.1995 | 0.1500 | 0.1265 | 0.1100 | 0.1050 |
| | Coefficient of variation [%] | 35.4 | 32.5 | 31.0 | 28.5 | 25.0 | 23.0 | 22.0 | 21.0 |
| 1000 | Sintered grain size [μm] | 2.70 | 2.20 | 1.80 | 1.40 | 1.00 | 0.70 | 0.65 | 0.65 |
| | Standard deviation | 0.8521 | 0.5940 | 0.4410 | 0.3080 | 0.2000 | 0.1260 | 0.1105 | 0.1073 |
| | Coefficient of variation [%] | 31.6 | 27.0 | 24.5 | 22.0 | 20.0 | 18.0 | 17.0 | 16.5 |
| 1100 | Sintered grain size [μm] | 3.69 | 3.80 | 3.60 | 2.60 | 1.90 | 1.70 | 1.70 | 1.60 |
| | Standard deviation | 0.8900 | 0.5600 | 0.7200 | 0.4680 | 0.3230 | 0.2720 | 0.2550 | 0.2240 |
| | Coefficient of variation [%] | 24.1 | 22.5 | 20.0 | 18.0 | 17.0 | 16.0 | 15.0 | 14.0 |
| 1200 | Sintered grain size [μm] | 6.00 | 5.80 | 5.70 | 5.40 | 5.20 | 5.00 | 4.90. | 4.90 |
| | Standard deviation | 1.5421 | 0.5600 | 1.1685 | 0.9450 | 0.8580 | 0.7500 | 0.6615 | 0.5880 |
| | Coefficient of variation [%] | 25.7 | 22.0 | 20.5 | 17.5 | 16.5 | 15.0 | 13.5 | 12.0 |

As given in the above Table 1, it is found that Working Examples E-1 to E-4 in which Al content is 20 mol ppm or greater and 20000 mol ppm or less (2 mol % or less) have smaller sintered grain sizes (many grain boundaries) than those in Comparative Examples 1-1 and 1-2 in which Al content is less than 20 mol ppm, even at any of the baking temperatures. At this time, there is a trend where the lower the baking temperature, the smaller the sintered grain size.

Working Examples E-1 to E-4, when at least the baking temperature is 900° C. and 1000° C., have smaller coefficients of variation and less variation of sintered grain size than those in Comparative Examples 1-1 and 1-2.

TABLE 2

| Baking temperature [° C.] | Sintered body characteristics | Comparative Example 1 | | Working Example E | | | | Comparative Example 1 | |
|---|---|---|---|---|---|---|---|---|---|
| | | 1-1 | 1-2 | E-1 | E-2 | E-3 | E-4 | 1-3 | 1-4 |
| | | \multicolumn{8}{c}{Al content [mol ppm]} | | | | | | | |
| | | 0 | 10 | 20 | 200 | 2000 | 20000 | 50000 | 100000 |
| 900 | Bending strength [MPa] | 107 | 109 | 111 | 109 | 105 | 100 | 95 | 90 |
| | Standard deviation | 1.0486 | 1.0573 | 1.0545 | 1.0137 | 0.966 | 0.96 | 0.931 | 0.9 |
| | Coefficient of variation [%] | 0.98 | 0.97 | 0.95 | 0.93 | 0.92 | 0.96 | 0.98 | 1 |
| 1000 | Bending strength [MPa] | 121 | 125 | 125 | 126 | 123 | 116 | 110 | 100 |
| | Standard deviation | 1.1253 | 1.15 | 1.1125 | 1.1088 | 1.0947 | 1.0556 | 1.023 | 0.95 |
| | Coefficient of variation [%] | 0.93 | 0.92 | 0.89 | 0.88 | 0.89 | 0.91 | 0.93 | 0.95 |
| 1100 | Bending strength [MPa] | 134 | 138 | 140 | 136 | 133 | 1285 | 122 | 114 |
| | Standard deviation | 1.2328 | 1.2558 | 1.232 | 1.1832 | 1.1704 | 1.152 | 1.1224 | 1.0716 |
| | Coefficient of variation [%] | 0.92 | 0.91 | 0.88 | 0.87 | 0.88 | 0.9 | 0.92 | 0.94 |
| 1200 | Bending strength [MPa] | 140 | 144 | 145 | 142 | 137 | 132 | 126 | 120 |
| | Standard deviation | 1.274 | 1.2816 | 1.2615 | 1.2212 | 1.1919 | 1.1616 | 1.1466 | 1.116 |
| | Coefficient of variation [%] | 0.91 | 0.89 | 0.87 | 0.86 | 0.87 | 0.88 | 0.91 | 0.93 |

As given in the above Table 2, Working Examples E-1 to E-4 in which Al content is 20 mol ppm or greater and 20000 mol ppm or less (2 mol % or less) show higher bending strengths than those in Comparative Examples 1-3 and 1-4 in which the Al content exceeds 20000 mol ppm, even at any of the baking temperatures. The bending strength of Comparative Examples 1-3 and 1-4 being low is thought to be caused by expansion due to formation of a spinel phase ($ZnAl_2O_4$) that is a heterogeneous phase.

TABLE 3

| Baking temperature [° C.] | Sintered body characteristics | Comparative Example 1 | | Working Example E | | | | Comparative Example 1 | | Reference Example 2 | |
|---|---|---|---|---|---|---|---|---|---|---|---|
| | | 1-1 | 1-2 | E-1 | E-2 | E-3 | E-4 | 1-3 | 1-4 | 2-1 | 2-2 |
| | | \multicolumn{10}{c}{Al content [mol ppm]} | | | | | | | | | |
| | | 0 | 10 | 20 | 200 | 2000 | 20000 | 50000 | 100000 | 200 | 20000 |
| 900 | Volume resistivity [Ω·cm] | 50000000 | 100000 | 14000 | 650 | 2500 | 40000 | 800000 | 5000000 | 7000 | 320000 |
| 1000 | | 1500000 | 4500 | 100 | 200 | 500 | 10000 | 100000 | 600000 | 800 | 25000 |
| 1100 | | 65000 | 400 | 60 | 35 | 40 | 80 | 800 | 6000 | 150 | 1450 |
| 1200 | | 4000 | 25 | 4.2 | 2.6 | 3 | 7 | 50 | 300 | 50 | 300 |

As given in the above Table 3, Working Examples E-1 to E-4 show tendencies of smaller volume resistivity and more excellent conductivity than those in Comparative Examples 1-1 to 1-4.

Particularly, when the baking temperature is 900 to 10000° C., it is found that Working Examples E-1 to E-4 have lower volume resistivity decreasing by around 2 digits than that in Comparative Example 1-1 in which Al is not added.

Synthesis Example 2 (Reference Examples 2)

The zinc oxide powder without adding aluminum prepared in Synthesis Example 1 (zinc oxide powder of Comparative Example 1-1) is added to aluminum nitrate aqueous solutions, mixed, and dried at 200° C., thereby obtaining zinc oxide powders having Al contents of 200 mol ppm and 20000 mol ppm (2 mol %). It is considered that the obtained zinc oxide powder has aluminum precipitated and fixed as an amorphous hydroxide on the powder particle surfaces.

Synthesis Example 4 (Reference Examples 4)

A zinc oxide powder is prepared in the following manner according to Patent Document 1.

Zinc nitrate 6-hydrate (manufactured by Kishida Chemical Co., Ltd.) is used as the zinc salt, aluminum nitrate 9-hydrate (manufactured by Kishida Chemical Co., Ltd.) is used as the aluminum salt, ammonium carbonate (manufactured by Kishida Chemical Co., Ltd.) is used as the carbonate, and 30% by mass sodium hydroxide (manufactured by Kishida Chemical Co., Ltd.) is used as the alkali.

Everything is the same as Synthesis Example 1 up to an alkali precipitate synthesis method. A combination of zinc nitrate and aluminum nitrate weighed to make a total amount of 0.5 mol is dissolved in 1 L of pure water, so as to prepare a mixed aqueous solution of zinc nitrate and aluminum nitrate.

0.5 L of a 0.4 mol ammonium carbonate aqueous solution is prepared in a 2 L beaker.

The mixed aqueous solution of zinc nitrate and aluminum nitrate is dripped at a rate of 1 L/h into a sodium hydrogen carbonate solution while the sodium hydrogen carbonate solution is stirred using a rotator at a rotating speed set to approximately 50 rpm. Solution feeding and pH control are carried out in the same way as in Synthesis Example 1, and then the 30% by mass sodium hydroxide is dripped into the sodium hydrogen carbonate solution. This maintains a constant pH of the sodium hydrogen carbonate solution at 7.5 while dripping the mixed aqueous solution of zinc nitrate and aluminum nitrate. As a result, a precipitate is generated through the precipitate generating reaction.

Once solution feeding is finished, the solution is stirred and cured for approximately 10 minutes using the rotator set to the same rotating speed of approximately 50 rpm as during the precipitation reaction, and then immediately separated into solid and liquid, rinsed, and vacuum dried, thereby obtaining a dried powder of the basic zinc carbonate. Using a cooling device, temperature of the ammonium carbonate aqueous solution is always kept under 30° C. during the precipitate generating reaction, and stirring and curing.

It is found from the results of the same analysis as in Synthesis Example 1 that a basic zinc carbonate having hydrozincite as a main component is obtained. Moreover, upon analysis of the filtrate, precipitate yield is found to be nearly 99%. Using the obtained basic zinc carbonate, heat treatment is carried out in the same way as in Synthesis Example 1, thereby obtaining a zinc oxide powder. In Synthesis Example 4, Al content is set to 0 mol ppm, 200 mol ppm, and 20000 mol ppm (2 mol %).

<Evaluation 2: Evaluation of Zinc Oxide Powder>

The zinc oxide powders of Synthesis Example 1 (Comparative Examples 1 and Working Examples E) and Synthesis Example 4 (Reference Examples 4) are subjected to X-ray diffraction analysis using an X-ray diffractometer (D8 ADVANCE, manufactured by Bruker Co., Ltd.), so as to find crystallite size, and are then subjected to measurement of specific surface area using a BET suction method with a BET specific surface area measurement device (AUTOSORB-MP1 manufactured by Quantachrome Instruments), so as to find BET diameter. In addition, untamped density and tap density are found using the methods described above. Results are given in Table 4 below.

TABLE 4

| | | | Al content [mol ppm] | Crystallite size [nm] | BET diameter [nm] | Untamped density [g/cm$^3$] | Tap density [g/cm$^3$] |
|---|---|---|---|---|---|---|---|
| Synthesis Example 1 | Comparative Example 1 | 1-1 | 0 | 80 | 88.0 | 0.82 | 1.35 |
| | Working Example E | E-2 | 200 | 68 | 72.8 | 0.79 | 1.29 |
| | | E-4 | 20000 | 52 | 54.6 | 0.68 | 1.12 |
| Synthesis Example 4 | Reference Example 4 | 4-1 | 0 | 85 | 93.5 | 0.36 | 0.59 |
| | | 4-2 | 200 | 50 | 53.5 | 0.24 | 0.39 |
| | | 4-3 | 20000 | 40 | 42.0 | 0.23 | 0.38 |

As given in Table 4, the zinc oxide powders of Synthesis Example 1 show higher untamped density and higher tap density than those in Synthesis Example 4. Therefore, it can be expected that the zinc oxide powders of Synthesis Example 1, when obtaining a molded sintered body, can obtain a dense sintered body even at a low temperature (e.g., 1000° C. or less) since shrinkage is low due to high filling density and increase in contact points among grains.

Moreover, in Synthesis Example 1 and Synthesis Example 4, temperatures (heat treatment temperatures) during heat treatment of the basic zinc carbonate are changed from just 360° C. to within a range of 350° C. to 420° C., and zinc oxide powders are prepared so as to find crystallite sizes and tap densities. Results are given in the graph of FIG. 3.

Figure 3:
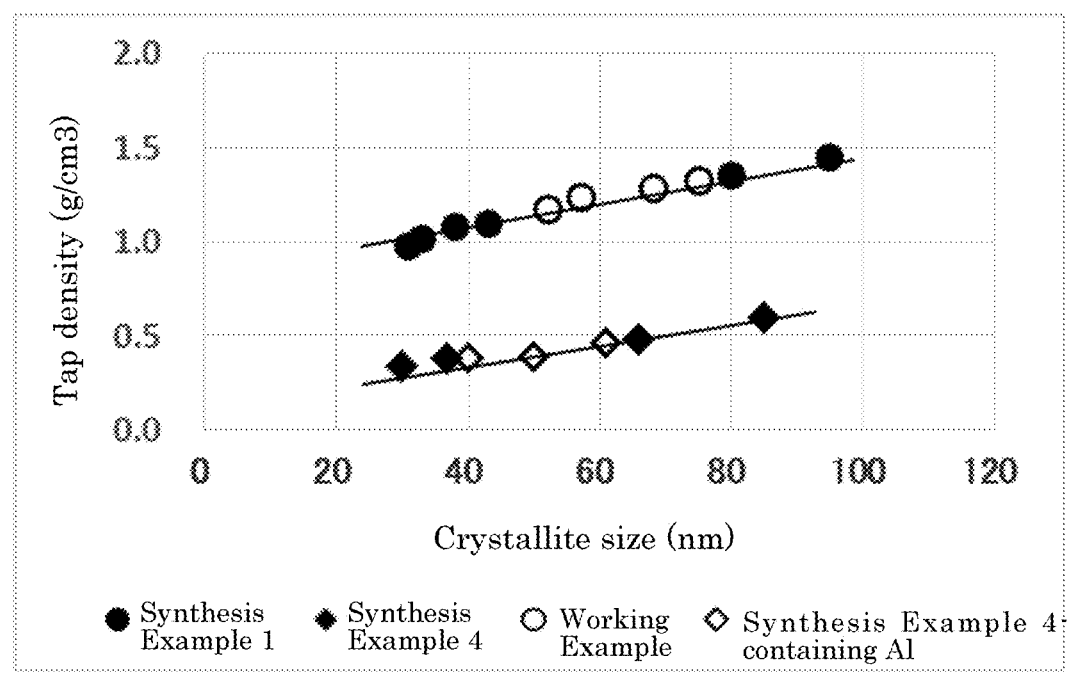
FIG. 3 is a graph showing relationships between tap density and crystallite size of the zinc oxide powders of Working Example 1, Synthesis Example 1, and Synthesis Example 4.

FIG. 3 is a graph showing relationships between tap density and crystallite size of the zinc oxide powders of Synthesis Examples 1 and 4.

In the graph of FIG. 3, Synthesis Example 1 (Working Examples E) in which the Al content is 20 mol ppm to 2 mol % is indicated by white circle plots, Synthesis Example 1 in which Al is not added is indicated by black circle plots, Synthesis Example 4 in which Al content is 20 mol ppm to 2 mol % is indicated by white diamond-shaped plots, and Synthesis Example 4 in which Al is not added is indicated by black diamond-shaped plots. The plots of the respective synthesis examples include differences in heat treatment temperature.

It is found from the graph of FIG. 3 that when the crystallite size in Synthesis Example 1 is the same degree as in Synthesis Example 4, approximately twice the tap density is obtained. Hardly any influence of the Al content on crystallite size and tap density is seen. Synthesis Example 2 shows no differences from Synthesis Example 1.

Here, the zinc oxide powders (Al is not added to either) of Synthesis Example 1 and Synthesis Example 4 are observed at an acceleration voltage of 3 kV using a very low acceleration SEM.

Figure 2:
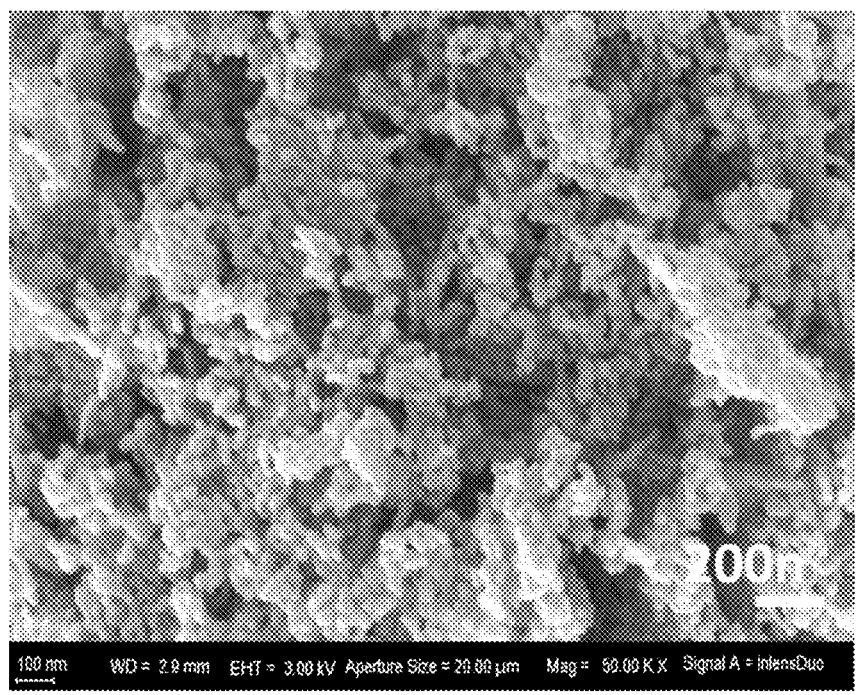
FIG. 2 is a SEM image of a zinc oxide powder of Synthesis Example 4 according to the present invention.

FIG. 1 is a SEM image of a zinc oxide powder of Synthesis Example 1. FIG. 2 is a SEM image of a zinc oxide powder of Synthesis Example 4. In Synthesis Example 1 (FIG. 1), it is confirmed that aggregation and coupling of particles configuring the zinc oxide powder are more insignificant than that in Synthesis Example 4 (FIG. 2), thereby controlling excessive grain growth.

In more detail, making the stirring force weaker and the stirring and curing duration shorter during the precipitate generating process, and stirring and curing, is thought to facilitate obtaining primary particles coupled into flake shapes (e.g., see FIG. 2 described later), which are a characteristic of layered hydroxide. In contrast, when the duration of stirring and curing is longer, the primary particles repeatedly collide into each other due to stirring, losing the flake shapes, and thus granular shapes (e.g., see FIG. 1 described later) are thought to be easily obtained.

While reasons why the tap density of the zinc oxide powder of Synthesis Example 1 is higher than that in Synthesis Example 4 (see FIG. 3) are unclear, aggregation and coupling of particles configuring the zinc oxide powder being insignificant (see FIG. 1), and secondary particles being formed through moderate aggregation are thought to be factors thereof.

<Evaluation 3: Evaluation of Molded Bodies>

The zinc oxide powder of Synthesis Example 4 is press molded in the same manner as in Synthesis Example 1 so as to manufacture 20 mm in diameter×2 mm disc-shaped molded bodies (n=15).

Density (unit: g/cm$^3$) of the disc-shaped molded bodies is found.

Molded body density is set as the average value for 15 samples, and standard deviation and coefficient of variation (=(standard deviation/average value)×100) are found. Coefficient of variation (unit: %) is an index of variation. Results are given in Table 5 below.

TABLE 5

| | | | Al content [mol ppm] | Molded body density [g/cm$^3$] | Standard deviation | Coefficient of variation [%] |
|---|---|---|---|---|---|---|
| Synthesis Example 1 | Comparative Example 1 | 1-1 | 0 | 2.89 | 0.0228 | 0.79 |
| | Working Example E | E-2 | 200 | 2.77 | 0.0225 | 0.81 |
| | | E-4 | 20000 | 2.48 | 0.0198 | 0.80 |
| Synthesis Example 4 | Reference Example 4 | 4-1 | 0 | 2.45 | 0.0294 | 1.20 |
| | | 4-2 | 200 | 2.40 | 0.0266 | 1.11 |
| | | 4-3 | 20000 | 2.38 | 0.0259 | 1.09 |

As given in Table 5, when the molded bodies of Working Examples E have the same Al content as those in Reference Examples 4, little variation and high density are seen. Therefore, the zinc oxide powders of Working Examples E are suitable for press molding.

<Evaluation 4: Evaluation of Sintered Bodies>

The zinc oxide powders of Synthesis Examples 2 and 4 are also press molded and baked, as in Synthesis Example 1, obtaining disc-shaped sintered bodies (n=15) and plate-shaped sintered bodies (n=15).

The disc-shaped sintered bodies are subjected to measurement of density (unit: g/cm$^3$) and sintered grain size (unit: μm) through observation using a SEM. Once the plate-shaped sintered bodies are processed into 30 mm×4 mm×4 mm bars, bending strength (unit: MPa) is measured in conformity to ISO178.

Sintered body density, sintered grain size, and bending strength are set as respective average values for 15 samples. Standard deviation and coefficient of variation (=(standard deviation/average value)×100) are also found for all of the sintered bodies. Coefficient of variation (unit: %) is an index of variation. Results are given in Table 6, Table 7 and Table 8 below.

TABLE 6

| | | | Al content [mol ppm] | Baking temperature [° C.] 900 | | | Baking temperature [° C.] 1000 | | | Baking temperature [° C.] 1200 | | |
|---|---|---|---|---|---|---|---|---|---|---|---|---|
| | | | | Sintered body density [g/cm$^3$] | Standard deviation | Coefficient of variation [%] | Sintered body density [g/cm$^3$] | Standard deviation | Coefficient of variation [%] | Sintered body density [g/cm$^3$] | Standard deviation | Coefficient of variation [%] |
| Synthesis Example 1 | Comparative Example 1 | 1-1 | 0 | 5.40 | 0.0486 | 0.90 | 5.45 | 0.0480 | 0.88 | 5.55 | 0.0477 | 0.86 |
| | Working Example E | E-2 | 200 | 5.35 | 0.0455 | 0.85 | 5.43 | 0.0461 | 0.85 | 5.58 | 0.0479 | 0.86 |
| | | E-4 | 20000 | 5.30 | 0.0435 | 0.82 | 5.35 | 0.0433 | 0.81 | 5.45 | 0.0452 | 0.83 |
| Synthesis Example 4 | Reference Example 4 | 4-1 | 0 | 5.20 | 0.0598 | 1.15 | 5.28 | 0.0633 | 1.20 | 5.35 | 0.0653 | 1.22 |
| | | 4-2 | 200 | 5.15 | 0.0567 | 1.10 | 5.23 | 0.0653 | 1.25 | 5.30 | 0.0663 | 1.25 |
| | | 4-3 | 20000 | 5.10 | 0.0612 | 1.20 | 5.20 | 0.0598 | 1.15 | 5.25 | 0.0683 | 1.30 |

TABLE 7

| | | | Al content [mol ppm] | Baking temperature [° C.] 900 | | | Baking temperature [° C.] 1000 | | | Baking temperature [° C.] 1200 | | |
|---|---|---|---|---|---|---|---|---|---|---|---|---|
| | | | | Bending strength [MPa] | Standard deviation | Coefficient of variation [%] | Bending strength [MPa] | Standard deviation | Coefficient of variation [%] | Bending strength [MPa] | Standard deviation | Coefficient of variation [%] |
| Synthesis Example 1 | Comparative Example 1 | 1-1 | 0 | 107 | 1.0486 | 0.98 | 121 | 1.1253 | 0.93 | 140 | 1.2740 | 0.91 |
| | Working Example E | E-2 | 200 | 109 | 1.0137 | 0.93 | 126 | 1.1088 | 0.88 | 138 | 1.1868 | 0.86 |
| | | E-4 | 20000 | 100 | 0.9600 | 0.96 | 116 | 1.0556 | 0.91 | 128 | 1.1264 | 0.88 |
| Synthesis Example 4 | Reference Example 4 | 4-1 | 0 | 95 | 1.1875 | 1.25 | 114 | 1.3680 | 1.20 | 125 | 1.4500 | 1.16 |
| | | 4-2 | 200 | 96 | 1.1808 | 1.23 | 110 | 1.2980 | 1.18 | 120 | 1.3560 | 1.13 |
| | | 4-3 | 20000 | 92 | 1.1592 | 1.26 | 104 | 1.2376 | 1.19 | 115 | 1.3225 | 1.15 |

TABLE 8

| | | | Al Content [mol ppm] | Baking temperature [° C.] 1000 | | | Baking temperature [° C.] 1200 | | |
|---|---|---|---|---|---|---|---|---|---|
| | | | | Sintered grain size [μm] | Standard deviation | Coefficient of variation [%] | Sintered grain size [μm] | Standard deviation | Coefficient of variation [%] |
| Synthesis Example 1 | Comparative Example 1 | 1-1 | 0 | 2.70 | 0.8521 | 31.6 | 6.00 | 1.5421 | 25.7 |
| | Working Example E | E-2 | 200 | 1.40 | 0.3080 | 22.0 | 5.40 | 0.9450 | 17.5 |
| | | E-4 | 20000 | 0.70 | 0.1260 | 18.0 | 5.00 | 0.7500 | 15.0 |
| Synthesis Example 4 | Reference Example 4 | 4-1 | 0 | 3.20 | 1.1264 | 35.2 | 7.20 | 2.2320 | 31.0 |
| | | 4-2 | 200 | 1.60 | 0.4480 | 28.0 | 6.00 | 1.3800 | 23.0 |
| | | 4-3 | 20000 | 0.80 | 0.1920 | 24.0 | 5.40 | 1.1880 | 22.0 |

As given in Table 6, when the molded bodies of Working Examples E have the same Al content as those in Reference Examples 4, little variation and high density are seen.

Moreover, as given in Table 7 and Table 8, when the molded bodies of Working Examples E have the same Al content as those in Reference Examples 4, tendencies of small sintered grain sizes, little variation thereof, and high strength are seen.

From the above, and taking the results given in Table 3 into consideration, the zinc oxide powders of Working Examples E are suitable as a zinc oxide powder for manufacturing the zinc oxide sintered body, which allows provision of a dense sintered body having excellent conductivity and high strength.

2. Zinc Oxide Varistor

Details of the zinc oxide varistor according to the embodiment of the present invention are described next.

(1) Manufacturing Method of Zinc Oxide Varistor

Figure 4:
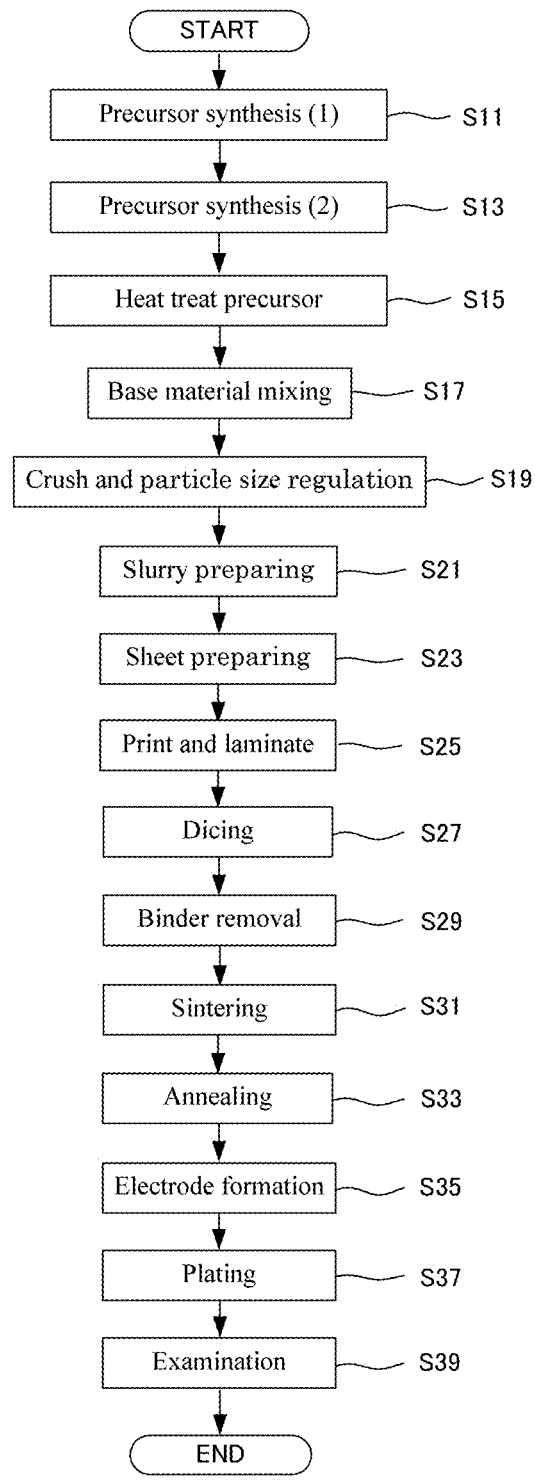
FIG. 4 is a flowchart showing zinc oxide varistor manufacturing steps in time series according to an embodiment of the present invention.

FIG. 4 is a flowchart showing in a time sequence a manufacturing process of a zinc oxide varistor (laminated varistor) according to the embodiment of the present invention, wherein focus is on the zinc oxide base material itself, and the zinc oxide powder constituted by the aforementioned grain size, tap density, etc. is used.

To begin with, base material for a zinc oxide varistor is manufactured. To do so, synthesis (1) of a precursor is carried out in step S11 of FIG. 4. More specifically, with the use of zinc nitrate hexahydrate, ammonium carbonate, and sodium hydroxide as described above, and pH of the ammonium carbonate is controlled at 7.5, a basic zinc carbonate slurry that becomes a precursor is made using a liquid-phase method. In the following step S13, synthesis (2) of a precursor is carried out. That is, the basic zinc carbonate slurry obtained in step S11 is subjected to solid-liquid separation by suction filtration. Afterwards, the resulting unnecessary sodium is rinsed and removed, and the solid content after rinsing is vacuum dried at 30° C. for 20 hours so as to make a dried powder of the basic zinc carbonate, which is the precursor.

In step S15, the basic zinc carbonate obtained in step S13 is put in an aluminum crucible and heat treated at 360° C. for six hours in an atmospheric environment. Zinc oxide (ZnO) satisfying the aforementioned crystallite size, grain diameter, untamped density, tap density, etc. is obtained through the process of steps S11 to S15.

In step S17, base material for a zinc oxide varistor is prepared and weighed.

Here, either 0.5 mol % of an oxide made of either bismuth (Bi) or praseodymium (Pr) or 0.5 mol % of an oxide including both Bi and Pr is added as an additive to 100 mol % zinc oxide obtained in the above steps. 0.5 mol % of one or more oxides of cobalt (Co), manganese (Mn), and nickel (Ni), which are transition metal elements, is then added. Moreover, either 20000 ppm or 20 ppm of one or more oxides of boron (B), gallium (Ga), and aluminum (Al), which are donor elements, is further added to this composition. Donor elements induce reduction in resistance of the zinc oxide in the zinc oxide varistor, and contribute to improvement in impulse resistance etc. Note that a different form of the aforementioned additives than oxides may be added.

In step S19, the varistor base material weighed as described above is crushed and sized in a ball grinder etc., and in the following step S21, a plasticizing agent, a dispersing agent, a dilution solvent, etc. are added to manufacture slurry. Then, in step S23, the slurry manufactured in step S21 is formed into a film with a doctor blade, manufacturing a green sheet of approximately 10 to 100 μm, for example.

In step S25, a capacitor pattern is printed using an electrode paste of platinum (Pt), palladium (Pd), Ag/Pd, etc., for example, and a laminated body of multiple layers including the green sheet on which an internal electrode is formed, is thermocompressed and bonded using a hot press or the like so as to be laminated. In the subsequent step S27, the laminated green sheet is cut to fit a predetermined product size and then diced.

In step S29, the laminated body after dicing is retained for ten hours at 500° C., for example, and the binder is removed. Then, in step S31, baking is carried out at 900° C., for example. Upon observation of a cross-section of the sintered body, which has resulted from such low temperature sintering, using a scanning electron microscope (SEM), grains of the zinc oxide do not grow abnormally, size and form are uniform, and a dense structure with few voids between zinc oxide grains are confirmed. As a result, the sintered body of zinc oxide has high bending strength (high strength) and high electric conductivity.

In step S33, the aforementioned sintered body is annealed at 700° C., for example. Then in step S35, a terminal electrode (external electrode) is formed using Ag paste or Ag/Pd paste, and baked at a predetermined temperature. Note that R formation (beveling) of the grains in a centrifugal barrel using an abrasive etc. may be carried out after the annealing process.

In step S37, plating on the external electrode formed in the above step S35 is carried out by electroplating in order of Ni layer, Sn layer, for example. Next in step S39, electrical characteristics such as varistor voltage, and surge current (impulse resistance), are examined, completing the zinc oxide varistor.

(2) Evaluation of Zinc Oxide Varistor

Figure 5:
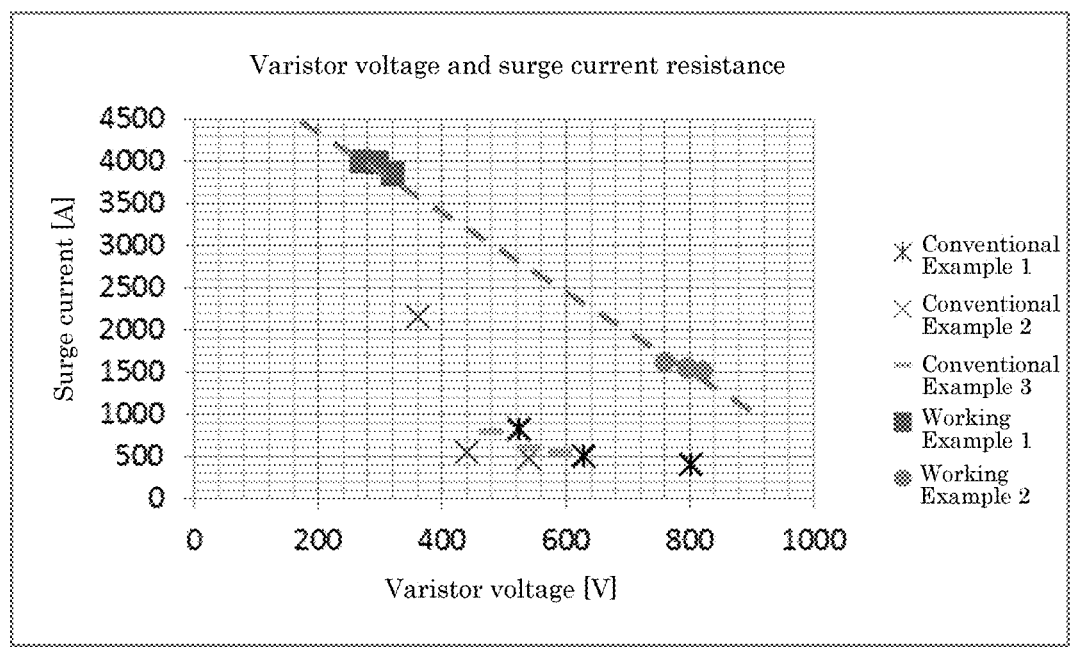
FIG. 5 is a diagram giving evaluation results of varistor voltage and surge resistance of the zinc oxide varistor according to the embodiment.
Figure 6:
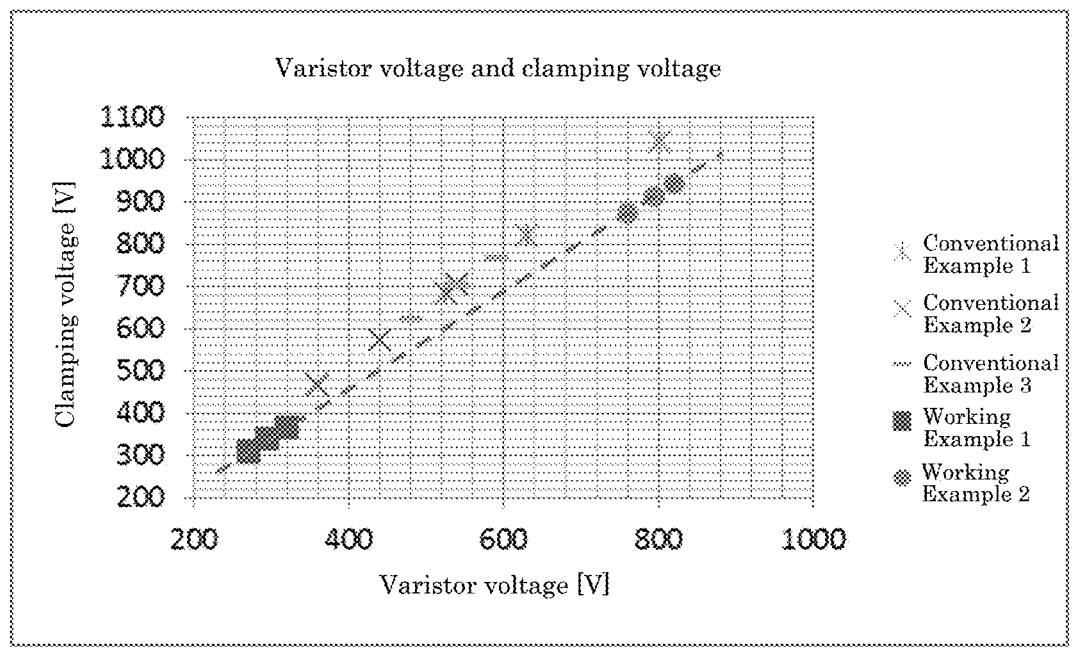
FIG. 6 is a diagram giving evaluation results of varistor voltage and clamping voltage of the zinc oxide varistor according to the embodiment.

FIGS. 5 and 6 are a graph showing evaluation results of the zinc oxide varistor manufactured through the processes described above. For performance evaluation, bulk-shaped samples having an element size of 9.8 mm×5 mm×1.0 mm and electrode dimensions of 7.5 mm×3.4 mm are used. Since varistor voltage and surge current are correlated, here, as shown in FIGS. 5 and 6, the zinc oxide varistor according to the embodiment and conventional products 1 to 3 are compared, wherein the horizontal axis gives varistor voltages, and the vertical axis gives surge currents and clamping voltage. Conventional Product 1 is a zinc oxide varistor using JIS grade powder manufactured using the French method. Conventional Product 2 is a zinc oxide varistor using a powder of dried basic zinc carbonate synthesized in Comparative Example 4 (Precursor Synthesis Example 5), and Conventional Product 3 is a zinc oxide varistor using a powder of dried basic zinc carbonate synthesized in Comparative Example 1 (Precursor Synthesis Example 2).

It is understood from the evaluation results given in FIGS. 5 and 6 that the characteristics of the zinc oxide varistor according to the embodiment (presented by a broken line in the graph where the straight-line approximation is applied to ● and ■ marks) have high surge performance and low clamping voltages, and even with any of the varistor voltages, have more excellent surge current resistance and lower clamping voltage than those of Conventional Products 1 to 3. Moreover, even if the zinc oxide varistor according to the embodiment is the same in size, the maximum surge performance three times or greater than the conventional products may be achieved. This means that even if the element is miniaturized to ⅓, the same performance as the conventional products may be secured.

On the other hand, it is found that aluminum content affects the varistor voltage of the zinc oxide varistor, as given in FIG. 5 and FIG. 6. That is, regarding the zinc oxide varistor using the zinc oxide powder to which aluminum (Al) is added as a donor element, Working Example 1 gives the result of an addition of 20 ppm of aluminum oxide, and Working Example 2 gives the result of an addition of 20000 ppm of aluminum oxide; it is determined from these findings that the more aluminum oxide is added, the higher the varistor voltage can be adjusted. Here, results regarding aluminum added amount and baking temperature, and varistor voltage, clamping voltage, and surge resistance of the zinc oxide varistor are given in detail in Table 9.

TABLE 9

| Baking temperature [° C.] | Characteristics | Al content [mol ppm] | | | | | | | |
|---|---|---|---|---|---|---|---|---|---|
| | | 0 | 10 | 20 | 200 | 2000 | 20000 | 50000 | 100000 |
| 900 | Sintered grain size [μm] | 1.10 | 1.00 | 0.80 | 0.70 | 0.60 | 0.55 | 0.50 | 0.50 |
| | Varistor voltage [V] | 122 | 196 | 295 | 501 | 699 | 791 | 999 | 1412 |
| | Clamping voltage [V] | 159 | 245 | 339 | 576 | 804 | 910 | 1149 | 1765 |
| | Surge resistance [A] | 1050 | 1670 | 3948 | 3095 | 2220 | 1560 | 620 | 335 |
| 1000 | Sintered grain size [μm] | 2.70 | 2.20 | 1.80 | 1.40 | 1.00 | 0.70 | 0.65 | 0.65 |
| | Varistor voltage [V] | 35.3 | 56.6 | 85.3 | 144.8 | 202.0 | 228.6 | 288.7 | 408.0 |
| | Clamping voltage [V] | 45.8 | 70.8 | 98.0 | 166.5 | 232.3 | 262.9 | 332.0 | 510.1 |
| | Surge resistance [A] | 1343 | 2136 | 5050 | 4503 | 3230 | 2270 | 902 | 487 |
| 1100 | Sintered grain size [μm] | 3.69 | 3.65 | 3.40 | 2.60 | 1.90 | 1.70 | 1.65 | 1.60 |
| | Varistor voltage [V] | 14.2 | 15.3 | 34.3 | 39.2 | 81.2 | 86.9 | 109.8 | 155.1 |
| | Clamping voltage [V] | 18.4 | 28.5 | 39.4 | 45.1 | 93.4 | 99.9 | 126.2 | 193.9 |
| | Surge resistance [A] | 2130 | 3387 | 8008 | 7138 | 5120 | 3598 | 1430 | 773 |
| 1200 | Sintered grain size [μm] | 6.00 | 5.80 | 5.70 | 5.40 | 5.20 | 5.00 | 4.90 | 4.90 |
| | Varistor voltage [V] | 9.0 | 9.2 | 10.0 | 10.2 | 11.0 | 12.0 | 12.7 | 13.1 |
| | Clamping voltage [V] | 13.3 | 13.0 | 12.5 | 12.8 | 13.8 | 15.0 | 18.9 | 29.1 |
| | Surge resistance [A] | 428 | 681 | 1610 | 1455 | 1320 | 928 | 369 | 199 |

Regarding the zinc oxide varistor according to the embodiment of the present invention, zinc oxide having crystallite size of 20 to 100 nm, particle diameter of 20 to 110 nm found using a specific surface area BET method, untamped density of 0.60 g/cm³ or greater, and tap density of 0.80 g/cm³ or greater is used as a varistor material. Since there is no abnormal grain growth in the zinc oxide sintered body and there are few gaps between particles, sintered particles have uniform size and high density, resulting in provision of a zinc oxide varistor with high surge resistance and low clamping voltage while securing high strength and high electric conductivity.

Moreover, a dense zinc oxide sintered body may be obtained by lowering the sintering temperature, that is, by low-temperature sintering at 900° C. or less due to the heat shrinkage behavior at the time of sintering, thereby allowing elimination of use of rare metals such as Pd, Au, Pt, and lowering cost of the varistor. Furthermore, since it has three or more times the surge performance than the conventional products even with the same size, the varistor may be miniaturized while securing the same performance as the conventional products.

Yet further, addition of aluminum (Al), as a donor element, to the zinc oxide (ZnO) powder used for the zinc oxide varistor such that the mol % of Al to zinc (Zn) is 5 to 100000 ppm allows control of sintered grain size in accordance with aluminum added amount. Such aluminum-added zinc oxide allows control of sintered grain size and reduction of variation in size, through increasing the baking temperature (e.g., 1200° C. or less) even when densifying. For example, by setting the aluminum added amount to 200 ppm in the case of a baking temperature of 950° C. or lower, and the aluminum added amount to 20000 ppm in the case of a baking temperature of 1050° C. or higher, control of grain growth and regulating particle size is possible.

Note that one or more kinds of an oxide of antimony (Sb) and chromium (Cr) for suppressing and controlling grain growth may be added as an additive to the base material mixture for the zinc oxide varistor of the embodiment. Moreover, silica glass composition (SiO₂ system) may be added as a glass component for stabilizing sintering.

The invention claimed is:

1. A zinc oxide varistor, comprising zinc oxide (ZnO) as a main component, one or more kinds of additives selected as a grain boundary forming component selected from the group consisting of bismuth (Bi) and praseodymium (Pr) and mixtures thereof, and one or more kinds of additives selected as a transition metal element selected from the group consisting of cobalt (Co), manganese (Mn) and nickel (Ni) and mixtures thereof; wherein the zinc oxide has a crystallite size of 20 to 100 nm found by X-ray diffraction, grain diameter of 20 to 110 nm found using a BET method, untamped density of 0.60 g/cm³ or greater, and tap density of 0.80 g/cm³ or greater.

2. The zinc oxide varistor according to claim 1, wherein an amount of aluminum (Al) 20 ppm to 20000 ppm in molar ratio is added as a donor element to zinc (Zn).

3. The zinc oxide varistor according to claim 2, wherein the aluminum-added zinc oxide, which is generated by adding the aluminum (Al), is obtained by heat treating at a temperature of 250° C. or higher, a carbonate hydrate generated through precipitate generating reactions in an aluminum salt aqueous solution, a zinc salt aqueous solution, a carbonate aqueous solution, and an alkali aqueous solution.

4. The zinc oxide varistor according to claim 3, wherein the carbonate hydrate contains either a basic zinc carbonate represented by the following Expression (1) or a hydrate of the basic zinc carbonate;

$$M_{4-6}(CO_3)_{1-3}(OH)_{6-7} \cdot nH_2O \qquad (1)$$

where M denotes $Zn_{1-x}Al_x$, x denotes a number $2 \times 10^{-5}$ to 0.02, and n denotes a number 0 to 2.

5. The zinc oxide varistor according to claim 2, wherein either powder of the aluminum-added zinc oxide is molded as is, or molded after either pulverizing using a bead mill or granulating using a spraying dryer, and sintered at a temperature of 1200° C. or lower, resulting in a zinc oxide sintered body.

6. The zinc oxide varistor according to claim 2, wherein one or more kinds of donor elements selected from the group consisting of boron (B) and gallium (Ga), and mixtures thereof is further added.

7. The zinc oxide varistor according to claim 1, wherein one or more kinds of donor elements selected from the group consisting of boron (B) and gallium (Ga), and mixtures thereof is further added.

* * * * *